(12) United States Patent
Bernacki et al.

(10) Patent No.: US 12,523,154 B1
(45) Date of Patent: Jan. 13, 2026

(54) GAS GENERATOR TURBINE BLADES IN GAS TURBINE ENGINES

(71) Applicants: GE Aerospace Poland Sp. z o.o., Warsaw (PL); GE Avio S.r.l., Rivalta di Torino (IT)

(72) Inventors: Paweł Bernacki, Warsaw (PL); Grzegorz Karpiński, Warsaw (PL); Francesco Bertini, Rivalta di Torino (IT)

(73) Assignees: GE Aerospace Poland SP. z o.o., Warsaw (PL); GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 19/089,918

(22) Filed: Mar. 25, 2025

(30) Foreign Application Priority Data

Feb. 26, 2025 (PL) .......................................... 451310

(51) Int. Cl.
*F01D 5/14* (2006.01)

(52) U.S. Cl.
CPC ...... *F01D 5/141* (2013.01); *F05D 2220/3213* (2013.01); *F05D 2240/301* (2013.01); *F05D 2250/74* (2013.01)

(58) Field of Classification Search
CPC .......... F01D 5/141; F01D 5/142; F01D 9/041; F05D 2220/3213; F05D 2240/123; F05D 2240/124; F05D 2240/128; F05D 2240/12; F05D 2240/301; F05D 2240/305; F05D 2240/306; F05D 2250/74
See application file for complete search history.

(56) References Cited

U.S. PATENT DOCUMENTS

| | | | |
|---|---|---|---|
| 7,946,801 B2 | 5/2011 | Shapiro et al. | |
| 11,105,200 B2 | 8/2021 | Clements et al. | |
| 11,578,600 B1 | 2/2023 | Tardif et al. | |
| 2014/0000280 A1* | 1/2014 | Allen-Bradley | F01D 5/141 |
| | | | 416/223 A |
| 2014/0000281 A1* | 1/2014 | Nash | F01D 5/141 |
| | | | 416/223 R |
| 2017/0198586 A1* | 7/2017 | Balzer | F01D 5/141 |
| 2020/0232328 A1* | 7/2020 | Song | F04D 29/324 |

\* cited by examiner

*Primary Examiner* — Christopher Verdier
(74) *Attorney, Agent, or Firm* — Hanley, Flight & Zimmerman, LLC (57) ABSTRACT

A gas generator turbine blade for a gas turbine engine includes a platform and an airfoil. The airfoil extends in a spanwise direction from the platform to a tip. The airfoil has an external airfoil surface formed in conformance with multiple cross-section airfoil profiles described by a set of Cartesian coordinates.

20 Claims, 7 Drawing Sheets

GAS GENERATOR TURBINE BLADES IN GAS TURBINE ENGINES

TECHNICAL FIELD

This disclosure relates to gas turbine engines and, more particularly, to gas generator turbine blades of gas turbine engines.

BACKGROUND

A gas turbine engine includes turbine blades and/or nozzles having airfoils subject to harsh temperatures and pressures. To achieve the best possible overall engine efficiency, these airfoils must meet several design criteria that help ensure these airfoils have a solid balance between aerodynamic and structural optimization. The design criteria for these airfoils are constantly being evaluated to improve, for instance, total power capability of the engine. In conducting such evaluations, specific thermal and mechanical requirements such as, for example, heat loading, parts life and manufacturing, use of combustion gases, throat area, vectoring, and/or interaction between different stages of airfoils of the turbine blades and/or nozzles of these engines are taken into consideration.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

Further exemplary aspects of the disclosure are described in more detail below with reference to the appended figures. Aspects of this disclosure may be combined without departing from the scope of the disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" refer to relative positions within a turbine engine or vehicle, and refer to the normal operational attitude of the turbine engine or vehicle. For example, with regard to a turbine engine, forward refers to a position on the turbine engine that is closer to the propeller or the fan and aft refers to a position on the turbine engine that is further away from the propeller or the fan. When the turbine engine is configured in a pusher configuration, the propeller or the fan is positioned on an aft side of the turbine engine such that forward refers to a position that is further away from the propeller or the fan and aft refers to a position that is closer to the propeller or the fan.

The terms "upstream" and "downstream" refer to the relative direction with respect to fluid flow in a fluid pathway. For example, "upstream" refers to the direction from which the fluid flows, and "downstream" refers to the direction to which the fluid flows.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, joined, etc.) are to be construed broadly and can include intermediate structural elements between a collection of elements and relative movement between elements unless otherwise indicated. Accordingly, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the terms "first," "second," "third," etc. may be used interchangeably to distinguish one component from another and are not intended to signify location or importance of the individual components. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The singular forms "a," "an," and "the" include plural references unless the context clearly dictates otherwise.

Although this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the inventive features illustrated herein, and any additional applications of the principles of this disclosure, as illustrated herein, which would occur to one skilled in the relevant art and having possession of this disclosure, are to be considered within the scope of this disclosure.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ this disclosure in any appropriately detailed structure.

The phrases "in an aspect," "in aspects," "in various aspects," "in some aspects," "in other aspects," or the like, may each refer to one or more of the same or different aspects in accordance with this disclosure.

Figure 1:
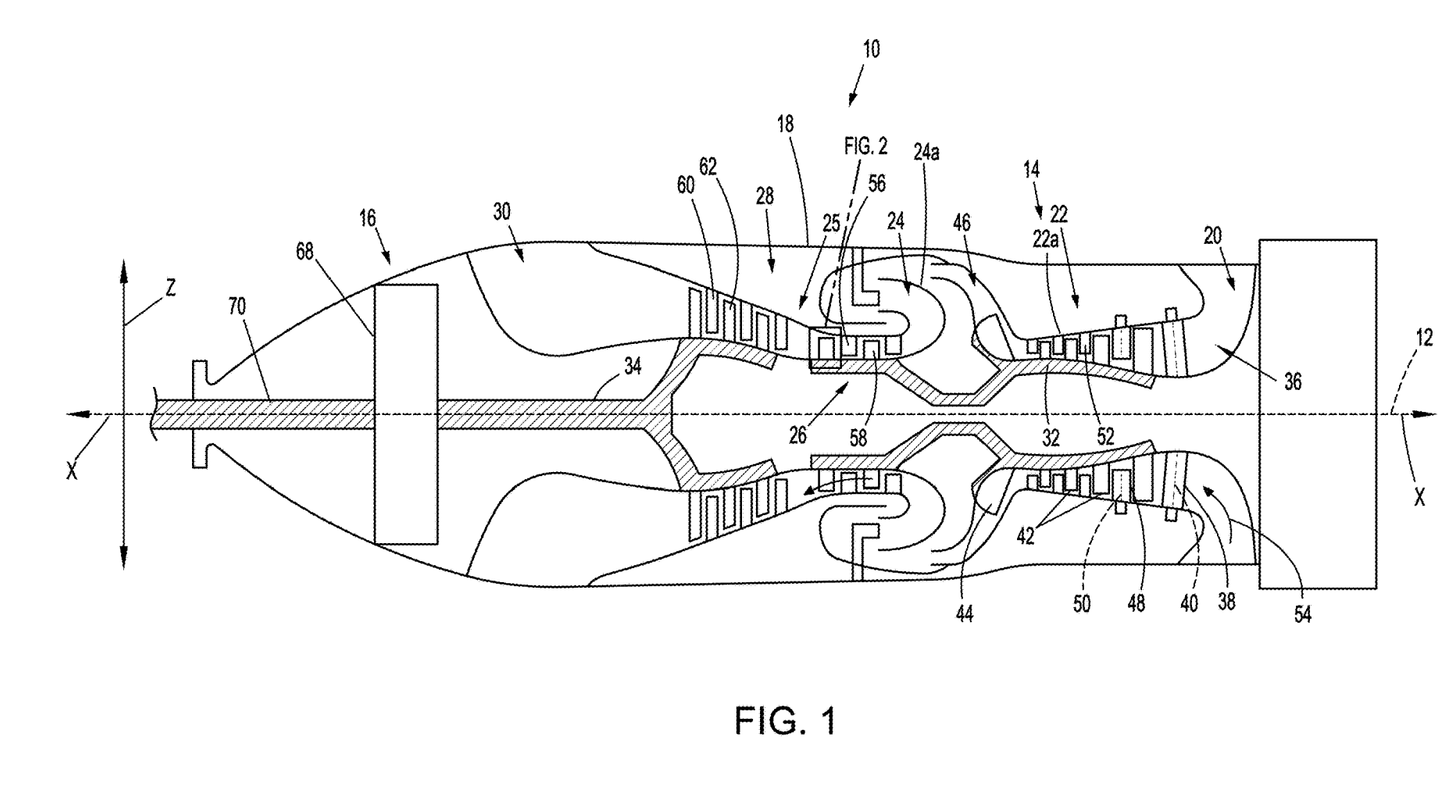
FIG. 1 is a schematic, cross-sectional view of an exemplary gas turbine engine according to various embodiments of the present subject matter.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a turboshaft engine, referred to herein as "turboshaft engine 10." It will be appreciated, however, that in other exemplary embodiments, the turboshaft engine 10 may instead be configured in any other suitable manner. For example, in other exemplary embodiments, the turboshaft engine 10 may instead be configured as a turboprop engine, or any other suitable gas turbine engine.

As shown in FIG. 1, the turboshaft engine 10 defines a longitudinal centerline 12 that extends in an axial direction X. The turboshaft engine 10 is also defined by directions transverse to axial direction X, namely, a radial direction Z and a circumferential/tangential direction Y (see e.g., FIG. 3A). In general, the turboshaft engine 10 includes a core turbine engine 14 and an output shaft assembly 16.

The exemplary core turbine engine 14 depicted generally includes a substantially tubular outer casing 18 that partially encloses an annular, radial inlet duct 20. The radial inlet duct 20 includes at least a portion extending generally along the radial direction Z, and is further configured to turn a direction of an air flow therethrough, such that the resulting airflow is generally along the axial direction X. Additionally, the outer casing 18 encases, in serial flow relationship, a compressor section 22 including a compressor 22a; a combustion section 24 including a reverse flow combustor 24a; a turbine section 25 including a gas generator or a high pressure (HP) turbine 26 and a low pressure (LP) turbine 28 (also known as the power turbine); and an exhaust section 30. Moreover, the turboshaft engine 10 depicted is a dual-spool engine, including a first, high pressure (HP) shaft or spool 32 coupling the HP turbine 26 to the compressor 22a, and a low pressure (LP) shaft or spool 34 coupled to the LP turbine 28, and drivingly connecting the LP turbine 28 to the output shaft assembly 16.

Compressor section 22, combustion section 24, turbine section 25, and exhaust section 30 together define a core air flow path 36 through the core turbine engine 14 and which includes a stage of inlet guide vanes 38, which may be configured as variable inlet guide vanes 38 that are rotatable, completely or partially, about a pitch axis 40. The guide vanes 38 to direct an airflow through the radial inlet duct 20 into the compressor 22a of the compressor section 22 in a desired direction. Additionally, in other exemplary embodiments, the stage of inlet guide vanes 38 may instead be located at any other suitable location within the radial inlet duct 20.

The compressor 22a of the compressor section 22 includes at least three stages of compressor rotor blades. More specifically, for the embodiment depicted, the compressor 22a of the compressor section 22 includes at least four stages of radially oriented compressor rotor blades 42, and an additional stage of centrifugal compressor rotor blades 44. The core turbine engine 14 further includes a transition duct 46 downstream of the compressor 22a. The transition duct 46 has at least a portion extending generally along the radial direction Z to provide a compressed air flow from the compressor 22a to the reverse flow combustor 24a. The stage of centrifugal compressor rotor blades 44 is configured to assist with turning the compressed air within the compressor section 22 radially outward into the transition duct 46. Notably, however, in other exemplary embodiments, the combustion section 24 may not include the reverse flow combustor 24. With such an exemplary embodiment, the compressor 22a may not include the stage of centrifugal compressor rotor blades 44.

Additionally, between each stage of compressor rotor blades 42, 44, the compressor section 22 includes a stage of compressor stator vanes for converting part of the airflow's dynamic pressure (velocity) into static pressure to increase the air pressure before entering the combustion section 24. In certain aspects, one or more stages of the compressor stator vanes can be configured as a stage of variable compressor stator vanes 48, such that each of the variable compressor stator vanes 48 may rotate about a respective pitch axis 50. Additionally, or alternatively, one or more of the compressor stator vanes are configured as fixed compressor stator vanes 52.

Similarly, as illustrated in FIG. 1, HP turbine 26 includes one or more sequential stages of HP turbine nozzle guide vanes (HP nozzles) 56 and HP turbine rotor blades (gas generator or HP turbine blades) 58 (e.g., first stage, second stage). HP nozzles 56 are coupled to the outer casing 18 and HP turbine blades 58 are coupled to the HP shaft 32. Likewise, LP turbine 28 includes one or more sequential stages of LP turbine nozzle guide vanes (LP nozzles) 60 and LP turbine rotor blades (LP turbine blades) 62 (e.g., third stage, fourth stage, fifth stage). LP nozzles 60 are coupled to the outer casing 18 and LP turbine blades 62 are coupled to the LP shaft 34. As can be appreciated, any number of stages of turbine blades 58, 62 and/or nozzles 56, 60 can be provided (e.g., one-stage, two-stage, three-stage, four-stage, five-stage, etc.) in the respective HP or LP turbines 26, 28. In addition, each stage can include an array of circumferentially spaced-apart blades or vanes.

It will be appreciated that during operation of the turboshaft engine 10, a volume of air 54 enters the turboshaft engine 10 through the radial inlet duct 20, and flows across the variable inlet guide vanes 38 and into the compressor 22a of the compressor section 22. A pressure of the air is increased as it is routed through the compressor 22a, and is then provided to the reverse flow combustor 24a of the combustion section 24, where the air is mixed with fuel and burned to provide combustion gases. The combustion gases are routed through the HP turbine 26 where a portion of thermal and/or kinetic energy from the combustion gases is extracted via sequential stages of HP nozzles 56 and HP turbine blades 58 that cause the HP shaft 32 to rotate and thereby support operation of the compressor 22a. The combustion gases are then routed through the LP turbine 28 where a second portion of thermal and kinetic energy is extracted from the combustion gases via sequential stages of LP nozzles 60 that cause the LP shaft 34 to rotate, thereby supporting operation of the output shaft assembly 16. The combustion gases are subsequently routed through the exhaust section 30 of the core turbine engine 14.

Notably, the drive shaft assembly 16 includes a gearbox 68 and a driveshaft 70. The LP shaft 34 is mechanically coupled to the drive shaft 70 of the drive shaft assembly 16 through the gearbox 68. As will be appreciated, the driveshaft 70 may be coupled to any suitable device. For example, in certain exemplary embodiments, the turboshaft engine 10 of FIG. 1 may be utilized to drive a propeller of a helicopter, may be utilized in aeroderivative applications, or may be attached to a propeller for an airplane, in which case the turboshaft engine 10 may instead be referred to as a turboprop engine.

Figure 2:
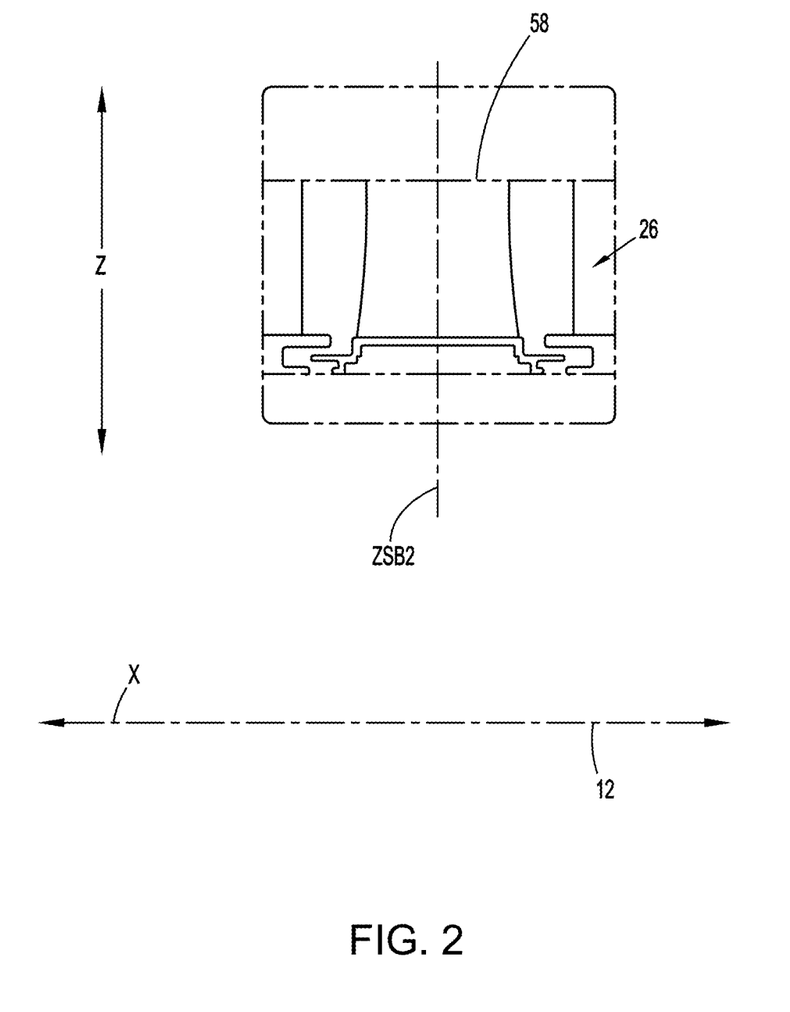
FIG. 2 is a cross-sectional, side view of a portion of a gas generator turbine section of the gas turbine engine of FIG. 1.

Each stage of LP or HP turbine blades and/or nozzles is mounted in a position along a stacking line that extends in the radial direction Z corresponding to a Z axis based on a Cartesian coordinate system. For instance, as seen in FIG. 2, in the gas generator turbine, namely HP turbine 26, HP turbine blades 58 are mounted in position along a stacking line corresponding to axis ZS2B. The stacking line defines the axial location (X) where the respective turbine blades are mounted along the centerline 12 of the engine 10.

With reference to the FIGS. 3A to 3C and 4A to 4C, each HP turbine blade 58 includes an airfoil 100 having an external airfoil surface 102 extending in a chordwise direction CW between a leading edge 104 and a trailing edge 106 and in a spanwise direction Z from a platform 108 to a tip 110. As can be appreciated, the platform 108 can have any suitable shape and/or configuration and may be coupled directly and/or indirectly (e.g., via a root 116) to a rotor disk (not shown). In some aspects, platform 108 is integrally formed with the rotor disk (e.g., a radially outward portion of the rotor disk). The airfoil 100 is provided between pressure and suction sides 112, 114 in an airfoil thickness direction T.

As can be appreciated, the disclosed turbine blades and/or nozzles can be constructed from any suitable material such as a high-strength, heat-resistant material such as a nickel-based or cobalt-based superalloy, or of a high-temperature, stress-resistant ceramic or composite material, for example. In cooled configurations, internal fluid passages and external cooling apertures provide for a combination of impingement and film cooling. In addition, one or more thermal barrier coatings (TBC), abrasion-resistant coatings, and/or other protective coatings may be applied to the turbine blades and/or nozzles.

Figure 3A:
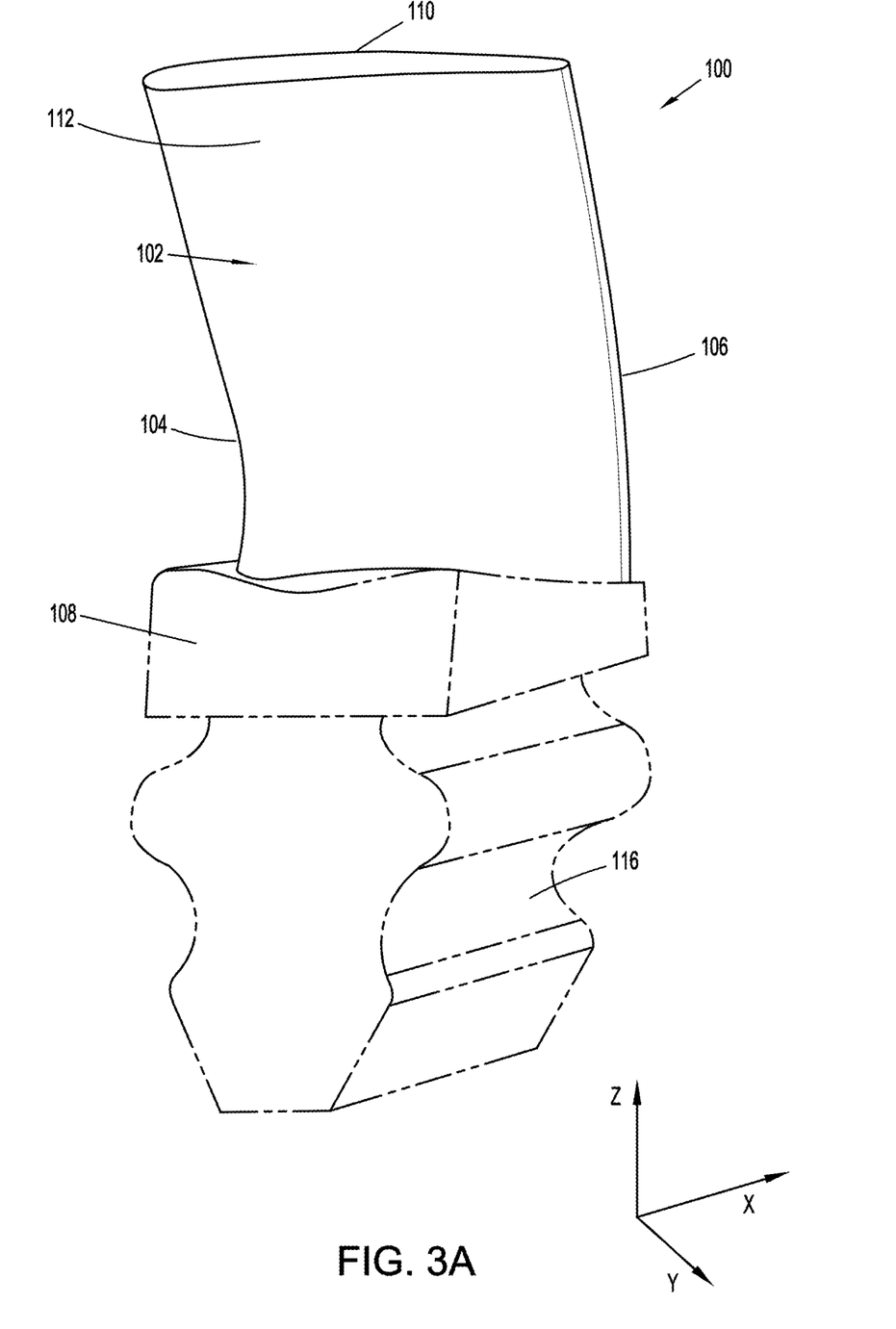
FIGS. 3A and 3B are isometric views illustrating a gas generator turbine blade of the gas turbine engine of FIG. 1.
Figure 3B:
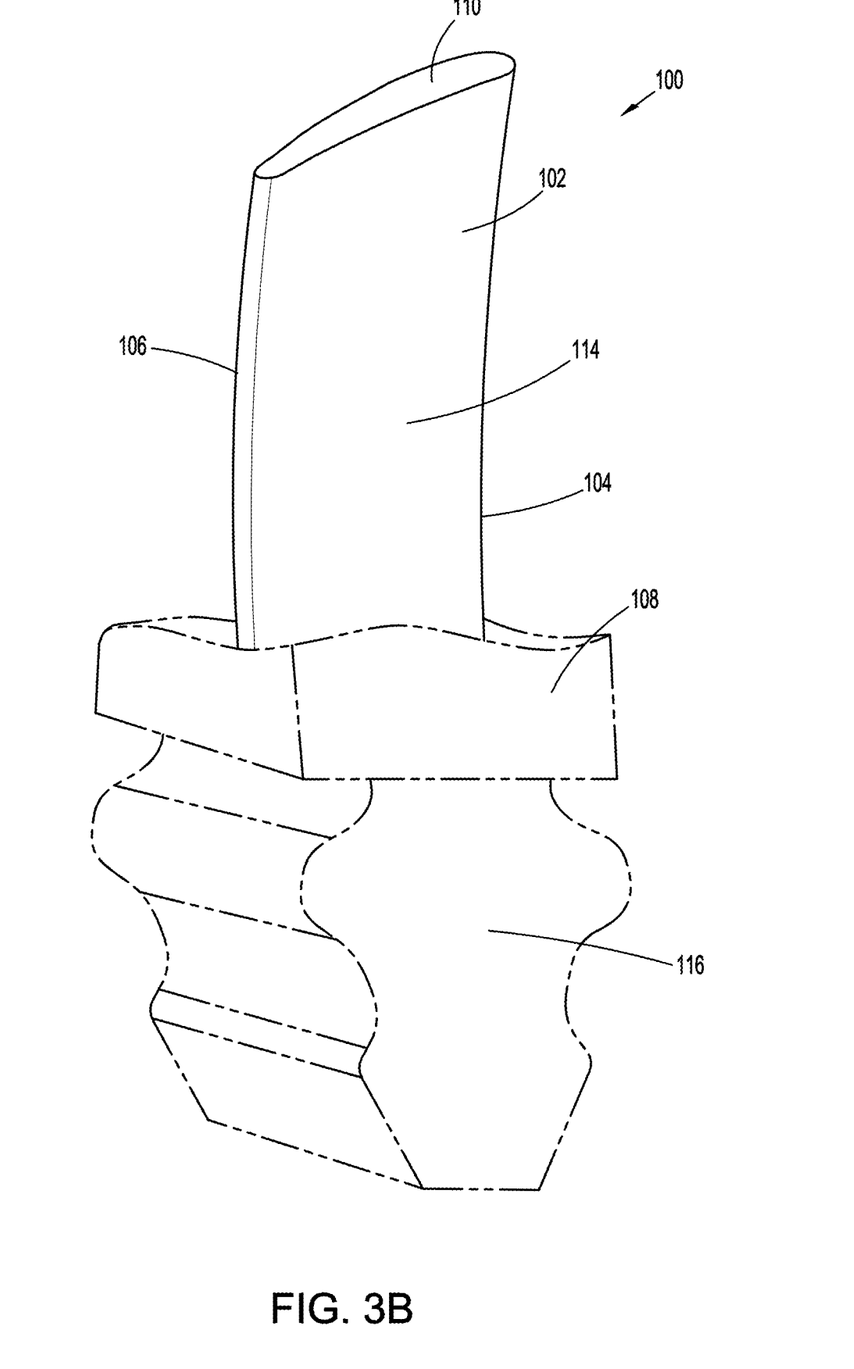
Figure 3C:
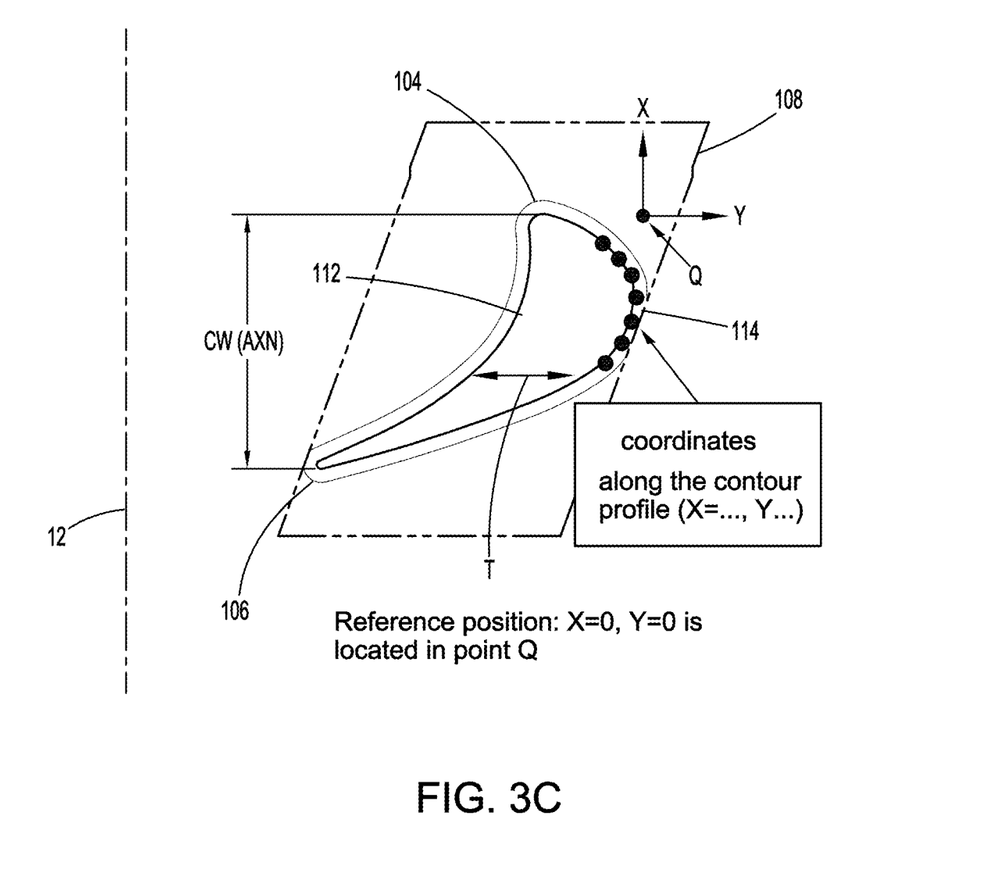
FIG. 3C is a schematic top view of the gas generator turbine blade of FIGS. 3A and 3B illustrating directional references.
Figure 4A:
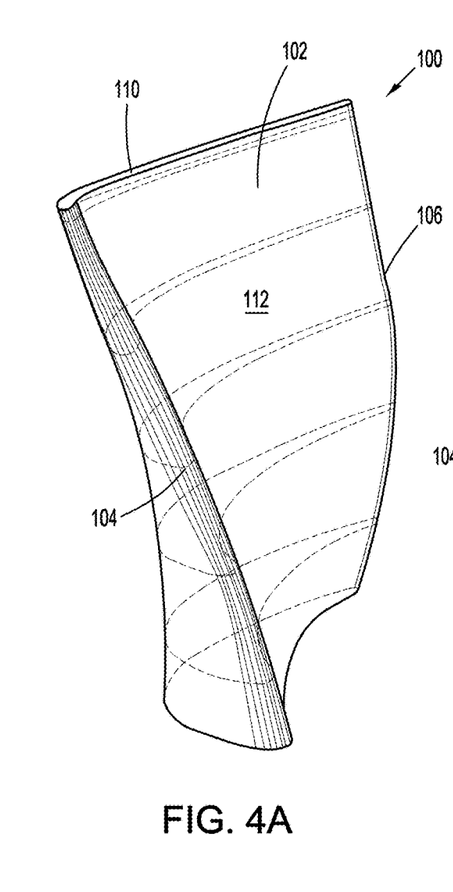
FIG. 4A is an isometric view of an exemplary gas generator turbine blade airfoil corresponding to the directional references of FIG. 3C.
Figure 4B:
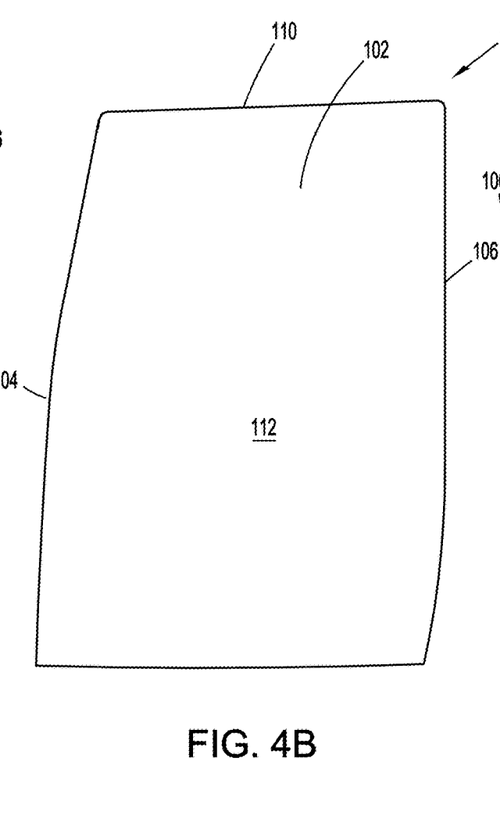
FIG. 4B is a pressure side view of the exemplary gas generator turbine blade airfoil shown in FIG. 4A.
Figure 4C:
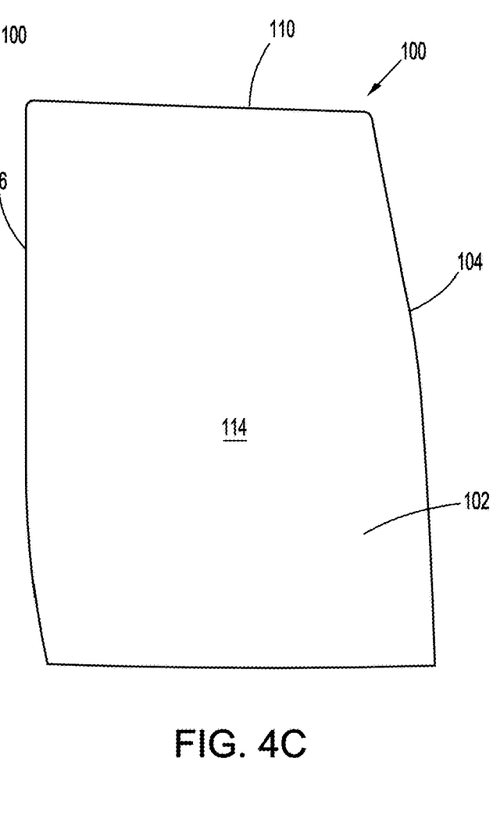
FIG. 4C is a suction side view of the exemplary gas generator turbine blade airfoil shown in FIG. 4A.
Figure 5:
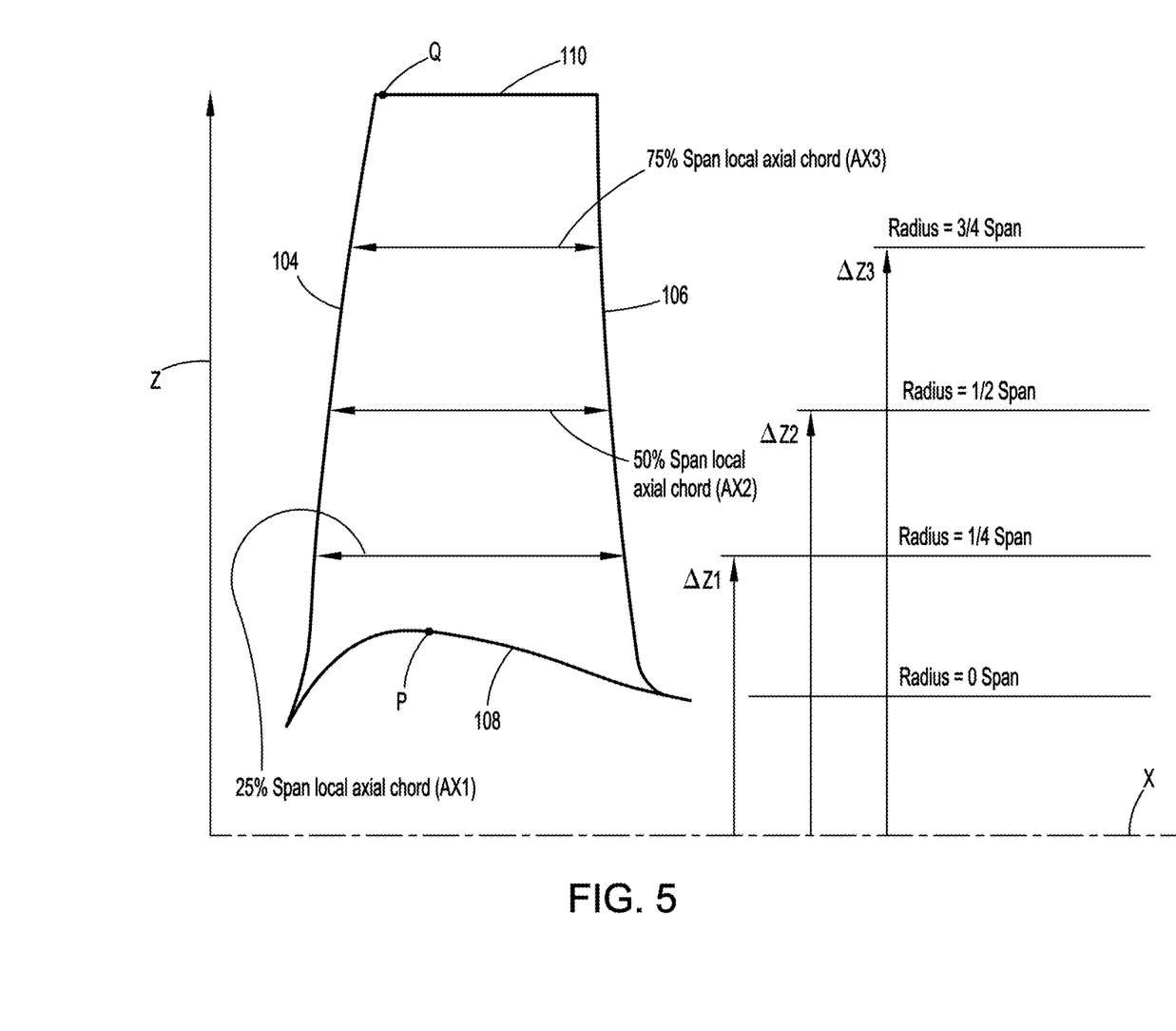
FIG. 5 depicts span positions and local axial chords referenced in Table 1 below.

Referring to FIG. 5, the geometries of external surfaces of the airfoil are described in terms of Cartesian coordinates defined along X, Y, and Z axes, which respectively correspond to the axial (X), circumferential/tangential (Y), and span/radial (Z-span) (Z) directions shown in FIGS. 3A-3C. The span coordinate is provided as a radial distance (ΔZ1-ΔZ3) from the rotation axis X of the airfoil. The "0" span is taken at a point P where the airfoil meets the platform 108, as schematically illustrated in FIG. 5. The overall or full span is 100% the distance from the point P to a point Q at the tip 110 in the span direction Z. By way of example, the "¼ span" (ΔZ1) is 25% the distance from the point P toward the tip 110 in the span direction Z. As best shown in FIG. 2, the X axis extends axially along the rotation axis of the turbine airfoil 100. The positive X direction is axially towards the aft of the turbine engine 10. The Y axis (FIG. 3C) extends tangentially with the positive Y direction which is in the direction of rotation of the airfoil 100.

The axial (X) and circumferential (Y) coordinates are normalized by a local axial chord (AXN) for the (3) given span location (AX1-AX3). By way of example, local axial chord (AX1) for axial (X) and circumferential (Y) coordinates associated with the ¼ span (ΔZ1) corresponds to the width of the airfoil between the leading and trailing edges 104, 106 at the ¼ span location (ΔZ1). As another example, local axial chord (AX2) for axial (X) and circumferential (Y) coordinates associated with the ½ span (ΔZ2) corresponds to the width of the airfoil between the leading and trailing edges 104, 106 at the ½ span location (ΔZ2). According to yet another example, local axial chord (AX3) for axial (X) and circumferential (Y) coordinates associated with the ¾ span (ΔZ3) corresponds to the width of the airfoil between the leading and trailing edges 104, 106 at the ¾ span location (ΔZ3).

The contour or profile of the airfoil is set forth in Table 1, which provides the axial (X) and circumferential (Y) coordinates (in inches) scaled by the local axial chord (AXN) for given span locations or positions. 3-D airfoil surfaces are formed by joining adjacent points in Table 1 in a smooth manner and joining adjacent sections or sectional profiles along the span. The manufacturing tolerance relative to the specified coordinates is ±0.0035 inches and/or ±0.05 inches. The coordinates define points on a cold, uncoated, stationary airfoil surface at nominal restagger, in a plane at the corresponding span positions. Additional elements such as cooling holes, protective coatings, fillets, and seal structures may also be formed onto the specified airfoil surface, or onto an adjacent platform surface, but these elements are not necessarily described by the normalized coordinates. For example, a variable coating may be applied between 0.001 inches and 0.0035 inches thick. In aspects, a coating is up to 0.02 inches thick.

TABLE 1

| Gas Generator Turbine Stage 2 Blade | | | | | | | | |
|---|---|---|---|---|---|---|---|---|
| Z1 (25%) span Z1 Axial Chord = AX1 | | | Z2 (50%) span Z2 Axial Chord = AX2 | | | Z3 (75%) span Z3 Axial Chord = AX3 | | |
| Point # | X | Y | Point # | X | Y | Point # | X | Y |
| 1 | −0.84786 | 0.71588 | 1 | −0.34869 | 0.37195 | 1 | −0.91920 | 1.04873 |
| 2 | −0.80800 | 0.84798 | 2 | −0.18321 | 0.25504 | 2 | −0.86022 | 0.89519 |
| 3 | −0.90395 | 0.87159 | 3 | 0.03726 | 0.17948 | 3 | −0.91920 | 1.04873 |
| 4 | −0.89412 | 0.84314 | 4 | −0.02371 | 0.19278 | 4 | −0.86615 | 0.91053 |
| 5 | −0.85090 | 0.90978 | 5 | −0.11016 | −0.03283 | 5 | −0.89567 | 0.98729 |
| 6 | −0.82532 | 0.87259 | 6 | −0.53337 | 0.15402 | 6 | −0.88388 | 1.08995 |

TABLE 1-continued

Gas Generator Turbine Stage 2 Blade

| | Z1 (25%) span Z1 Axial Chord = AX1 | | | Z2 (50%) span Z2 Axial Chord = AX2 | | | Z3 (75%) span Z3 Axial Chord = AX3 | |
|---|---|---|---|---|---|---|---|---|
| Point # | X | Y | Point # | X | Y | Point # | X | Y |
| 7 | −0.85933 | 0.92225 | 7 | −0.01639 | 0.02231 | 7 | −0.79661 | 0.97324 |
| 8 | −0.88915 | 0.82894 | 8 | −0.63460 | 0.31151 | 8 | −0.85026 | 1.05607 |
| 9 | −0.87900 | 0.94440 | 9 | −0.57806 | 0.21801 | 9 | −0.76973 | 0.93186 |
| 10 | −0.89368 | 0.94673 | 10 | −0.39524 | 0.41357 | 10 | −0.90743 | 1.01801 |
| 11 | −0.86771 | 0.93474 | 11 | −0.45131 | 0.06004 | 11 | −0.92063 | 1.06491 |
| 12 | −0.91802 | 0.91445 | 12 | −0.35147 | −0.01434 | 12 | −0.78767 | 0.95943 |
| 13 | −0.86367 | 0.75816 | 13 | −0.40395 | 0.01940 | 13 | −0.84128 | 1.04228 |
| 14 | −0.87399 | 0.78643 | 14 | −0.11280 | 0.22145 | 14 | −0.76072 | 0.91809 |
| 15 | −0.77271 | 0.79923 | 15 | −0.09826 | 0.21576 | 15 | −0.88388 | 0.95658 |
| 16 | −0.91362 | 0.90008 | 16 | −0.15552 | 0.24062 | 16 | −0.80554 | 0.98705 |
| 17 | −0.90880 | 0.88583 | 17 | 0.06289 | 0.11775 | 17 | −0.85427 | 0.87985 |
| 18 | −0.78162 | 0.81136 | 18 | 0.01751 | 0.05457 | 18 | −0.88978 | 0.97193 |
| 19 | −0.86886 | 0.77228 | 19 | −0.47276 | 0.49058 | 19 | −0.87207 | 0.92588 |
| 20 | −0.86771 | 0.93474 | 20 | −0.06773 | −0.01310 | 20 | −0.86927 | 1.08282 |
| 21 | −0.84242 | 0.89735 | 21 | −0.61906 | 0.28443 | 21 | −0.82340 | 1.01467 |
| 22 | −0.87909 | 0.80058 | 22 | −0.36050 | 0.38216 | 22 | −0.84831 | 0.86452 |
| 23 | −0.88414 | 0.81476 | 23 | −0.29398 | −0.03847 | 23 | −0.91332 | 1.03337 |
| 24 | −0.91636 | 0.92922 | 24 | −0.23279 | −0.05033 | 24 | −0.85933 | 1.06979 |
| 25 | −0.81669 | 0.86027 | 25 | −0.36508 | −0.00669 | 25 | −0.77871 | 0.94564 |
| 26 | −0.75472 | 0.77511 | 26 | −0.05386 | 0.20087 | 26 | −0.90010 | 1.08874 |
| 27 | −0.85845 | 0.74405 | 27 | −0.18601 | −0.05024 | 27 | −0.90155 | 1.00265 |
| 28 | −0.79927 | 0.83573 | 28 | −0.64972 | 0.33883 | 28 | −0.83234 | 1.02848 |
| 29 | −0.85318 | 0.72996 | 29 | −0.26370 | −0.04604 | 29 | −0.91349 | 1.07952 |
| 30 | −0.89906 | 0.85736 | 30 | −0.41625 | 0.02900 | 30 | −0.81447 | 1.00086 |
| 31 | −0.90743 | 0.94113 | 31 | −0.42824 | 0.03900 | 31 | −0.87798 | 0.94123 |
| 32 | −0.83390 | 0.88495 | 32 | −0.04125 | 0.00342 | 32 | −0.83635 | 0.83388 |
| 33 | −0.79047 | 0.82352 | 33 | 0.03759 | 0.07846 | 33 | −0.82430 | 0.80327 |
| 34 | −0.76375 | 0.78715 | 34 | −0.64221 | 0.32514 | 34 | −0.79381 | 0.72689 |
| 35 | −0.64667 | 0.27902 | 35 | −0.42903 | 0.44600 | 35 | −0.64202 | 0.38045 |
| 36 | −0.54883 | 0.53579 | 36 | −0.37836 | 0.00151 | 36 | −0.54715 | 0.60587 |
| 37 | −0.42490 | 0.42624 | 37 | −0.39132 | 0.01022 | 37 | −0.38849 | 0.39595 |
| 38 | −0.36396 | 0.38215 | 38 | −0.27894 | −0.04266 | 38 | −0.59738 | 0.29244 |
| 39 | −0.61128 | 0.60097 | 39 | −0.08358 | 0.21044 | 39 | −0.62291 | 0.71346 |
| 40 | −0.62339 | 0.24035 | 40 | −0.00849 | 0.18929 | 40 | −0.73356 | 0.87690 |
| 41 | 0.63138 | 0.62336 | 41 | −0.05429 | −0.00515 | 41 | −0.73710 | 0.59015 |
| 42 | −0.71800 | 0.72743 | 42 | −0.62689 | 0.29794 | 42 | −0.72411 | 0.55993 |
| 43 | −0.53809 | 0.52525 | 43 | −0.20159 | −0.05117 | 43 | −0.78143 | 0.69641 |
| 44 | −0.60719 | 0.21499 | 44 | −0.37219 | 0.39251 | 44 | −0.49874 | 0.53939 |
| 45 | −0.31295 | 0.35023 | 45 | −0.41786 | 0.43509 | 45 | −0.62747 | 0.35095 |
| 46 | −0.78017 | 0.54851 | 46 | −0.33754 | −0.02139 | 46 | −0.61354 | 0.69994 |
| 47 | −0.68022 | 0.68058 | 47 | −0.03884 | 0.19664 | 47 | −0.61260 | 0.32161 |
| 48 | −0.71069 | 0.39832 | 48 | −0.06878 | 0.20547 | 48 | −0.58963 | 0.27793 |
| 49 | −0.63128 | 0.25316 | 49 | −0.48385 | 0.09372 | 49 | −0.53754 | 0.59252 |
| 50 | −0.57002 | 0.55716 | 50 | 0.02782 | 0.06629 | 50 | −0.57383 | 0.24908 |
| 51 | −0.73692 | 0.45248 | 51 | −0.58652 | 0.23113 | 51 | −0.58178 | 0.26348 |
| 52 | −0.74563 | 0.76312 | 52 | −0.52389 | 0.14162 | 52 | −0.56576 | 0.23475 |
| 53 | −0.57296 | 0.16549 | 53 | −0.26253 | 0.30478 | 53 | −0.74264 | 0.89061 |
| 54 | −0.74960 | 0.47977 | 54 | −0.38377 | 0.40298 | 54 | −0.39878 | 0.40878 |
| 55 | −0.82056 | 0.64578 | 55 | −0.21720 | −0.05119 | 55 | −0.74354 | 0.60529 |
| 56 | −0.80357 | 0.60396 | 56 | 0.06784 | 0.13252 | 56 | −0.46925 | 0.49983 |
| 57 | −0.66092 | 0.65749 | 57 | −0.12491 | −0.03793 | 57 | −0.50850 | 0.55263 |
| 58 | −0.55947 | 0.54643 | 58 | −0.17050 | −0.04843 | 58 | −0.43936 | 0.46057 |
| 59 | −0.51631 | 0.50449 | 59 | −0.21026 | 0.27063 | 59 | −0.79996 | 0.74215 |
| 60 | −0.84249 | 0.70182 | 60 | −0.24968 | 0.29591 | 60 | −0.60414 | 0.68644 |
| 61 | −0.32589 | 0.35790 | 61 | −0.27524 | 0.31386 | 61 | −0.56627 | 0.63264 |
| 62 | −0.38871 | 0.39927 | 62 | −0.23669 | 0.28726 | 62 | −0.65629 | 0.41009 |
| 63 | −0.40089 | 0.40809 | 63 | −0.30878 | −0.03350 | 63 | −0.77519 | 0.68119 |
| 64 | −0.82611 | 0.65976 | 64 | −0.14143 | 0.23389 | 64 | −0.37813 | 0.38317 |
| 65 | −0.60110 | 0.58989 | 65 | −0.02861 | 0.01258 | 65 | −0.42930 | 0.44756 |
| 66 | −0.67608 | 0.33152 | 66 | −0.55176 | 0.17926 | 66 | −0.80608 | 0.75741 |
| 67 | −0.83708 | 0.68778 | 67 | −0.44010 | 0.45701 | 67 | −0.65086 | 0.75412 |
| 68 | −0.69925 | 0.70389 | 68 | −0.40660 | 0.42428 | 68 | −0.83033 | 0.81857 |
| 69 | −0.75584 | 0.49346 | 69 | −0.19682 | 0.26270 | 69 | −0.69760 | 0.49972 |
| 70 | −0.61536 | 0.22762 | 70 | −0.47326 | 0.08224 | 70 | −0.71095 | 0.52978 |
| 71 | −0.73648 | 0.75117 | 71 | −0.24830 | −0.04861 | 71 | −0.75169 | 0.90434 |
| 72 | −0.67061 | 0.66900 | 72 | 0.02217 | 0.18341 | 72 | −0.76893 | 0.66598 |
| 73 | −0.69019 | 0.35810 | 73 | −0.13991 | −0.04225 | 73 | −0.63225 | 0.72700 |
| 74 | −0.66159 | 0.30515 | 74 | −0.46196 | 0.47931 | 74 | −0.76263 | 0.65079 |
| 75 | −0.71736 | 0.41180 | 75 | −0.59485 | 0.24433 | 75 | −0.66332 | 0.42496 |
| 76 | −0.74329 | 0.46611 | 76 | −0.43993 | 0.04936 | 76 | −0.52789 | 0.57920 |
| 77 | −0.46002 | 0.45459 | 77 | −0.49420 | 0.10541 | 77 | −0.40901 | 0.42166 |
| 78 | −0.83162 | 0.67376 | 78 | 0.05540 | 0.10410 | 78 | −0.75630 | 0.63561 |
| 79 | −0.58176 | 0.17770 | 79 | −0.54265 | 0.16658 | 79 | −0.41918 | 0.43459 |

TABLE 1-continued

Gas Generator Turbine Stage 2 Blade

| Z1 (25%) span Z1 Axial Chord = AX1 | | | Z2 (50%) span Z2 Axial Chord = AX2 | | | Z3 (75%) span Z3 Axial Chord = AX3 | | |
|---|---|---|---|---|---|---|---|---|
| Point # | X | Y | Point # | X | Y | Point # | X | Y |
| 80 | −0.78611 | 0.56234 | 80 | −0.60305 | 0.25762 | 80 | −0.58527 | 0.65950 |
| 81 | −0.59886 | 0.20245 | 81 | −0.28780 | 0.32312 | 81 | −0.71533 | 0.84952 |
| 82 | −0.77418 | 0.53471 | 82 | −0.61111 | 0.27099 | 82 | −0.73063 | 0.57503 |
| 83 | −0.66889 | 0.31831 | 83 | −0.56945 | 0.20499 | 83 | −0.81218 | 0.77269 |
| 84 | −0.65419 | 0.29205 | 84 | −0.50431 | 0.11730 | 84 | −0.51821 | 0.56590 |
| 85 | −0.76813 | 0.52093 | 85 | 0.05540 | 0.10406 | 85 | −0.57578 | 0.64606 |
| 86 | −0.72395 | 0.42533 | 86 | −0.15512 | −0.04576 | 86 | −0.84234 | 0.84920 |
| 87 | −0.73047 | 0.43889 | 87 | −0.65713 | 0.35257 | 87 | −0.47912 | 0.51298 |
| 88 | −0.52725 | 0.51482 | 88 | −0.66446 | 0.36636 | 88 | −0.69701 | 0.82219 |
| 89 | −0.62137 | 0.61213 | 89 | −0.22355 | 0.27882 | 89 | −0.64157 | 0.74055 |
| 90 | −0.41296 | 0.41709 | 90 | −0.30024 | 0.33256 | 90 | −0.67029 | 0.43986 |
| 91 | −0.64130 | 0.63467 | 91 | −0.32471 | 0.35195 | 91 | −0.45933 | 0.48671 |
| 92 | −0.47149 | 0.46433 | 92 | −0.67170 | 0.38019 | 92 | −0.36770 | 0.37045 |
| 93 | −0.59083 | 0.57889 | 93 | −0.46242 | 0.07101 | 93 | −0.70618 | 0.83585 |
| 94 | −0.37640 | 0.39062 | 94 | −0.16945 | 0.24768 | 94 | −0.72445 | 0.86320 |
| 95 | −0.65115 | 0.64605 | 95 | 0.00669 | 0.04332 | 95 | −0.44937 | 0.47362 |
| 96 | −0.33871 | 0.36579 | 96 | −0.08153 | −0.02039 | 96 | −0.66013 | 0.76771 |
| 97 | −0.68977 | 0.69221 | 97 | 0.04680 | 0.09107 | 97 | −0.68782 | 0.80855 |
| 98 | −0.58047 | 0.56798 | 98 | −0.33676 | 0.36188 | 98 | −0.67720 | 0.45479 |
| 99 | −0.49411 | 0.48417 | 99 | −0.45107 | 0.46812 | 99 | −0.68406 | 0.46974 |
| 100 | −0.44843 | 0.44500 | 100 | −0.32330 | −0.02779 | 100 | −0.60504 | 0.30700 |
| 101 | −0.50526 | 0.49427 | 101 | −0.12719 | 0.22750 | 101 | −0.48895 | 0.52617 |
| 102 | 0.35140 | 0.37387 | 102 | 0.06858 | 0.14804 | 102 | −0.64919 | 0.39526 |
| 103 | −0.43672 | 0.43554 | 103 | 0.05134 | 0.17281 | 103 | −0.63478 | 0.36568 |
| 104 | −0.72727 | 0.73928 | 104 | 0.06283 | 0.16237 | 104 | −0.59472 | 0.67296 |
| 105 | −0.69711 | 0.37146 | 105 | −0.56068 | 0.19207 | 105 | −0.62008 | 0.33626 |
| 106 | −0.63904 | 0.26605 | 106 | −0.51421 | 0.12937 | 106 | −0.55673 | 0.61924 |
| 107 | −0.79198 | 0.57619 | 107 | −0.31254 | 0.34217 | 107 | −0.70430 | 0.51474 |
| 108 | −0.81495 | 0.63182 | 108 | 0.00681 | 0.18617 | 108 | −0.78763 | 0.71165 |
| 109 | −0.29988 | 0.34277 | 109 | −0.09569 | −0.02697 | 109 | −0.66938 | 0.78131 |
| 110 | −0.48286 | 0.47419 | 110 | −0.00462 | 0.03256 | 110 | −0.69085 | 0.48472 |
| 111 | −0.80929 | 0.61788 | 111 | −0.71161 | 0.77896 | 111 | −0.81825 | 0.78797 |
| 112 | −0.70865 | 0.71564 | 112 | −0.62612 | 0.66746 | 112 | −0.74994 | 0.62044 |
| 113 | −0.68318 | 0.34479 | 113 | −0.49413 | 0.51335 | 113 | −0.71755 | 0.54485 |
| 114 | −0.76202 | 0.50718 | 114 | −0.59664 | 0.63107 | 114 | −0.67861 | 0.79492 |
| 115 | −0.59039 | 0.19002 | 115 | −0.50470 | 0.52484 | 115 | −0.09430 | −0.10173 |
| 116 | −0.70394 | 0.38487 | 116 | −0.56660 | 0.59514 | 116 | −0.37977 | −0.01489 |
| 117 | −0.79781 | 0.59006 | 117 | −0.63583 | 0.67969 | 117 | −0.31468 | −0.06497 |
| 118 | −0.49545 | 0.07355 | 118 | −0.52561 | 0.54802 | 118 | −0.43649 | 0.04458 |
| 119 | −0.23269 | 0.30900 | 119 | −0.65508 | 0.70427 | 119 | −0.20966 | 0.20335 |
| 120 | −0.27423 | −0.04417 | 120 | −0.48349 | 0.50192 | 120 | −0.30322 | 0.29576 |
| 121 | −0.16259 | 0.28177 | 121 | −0.70231 | 0.76642 | 121 | −0.12976 | 0.14565 |
| 122 | −0.03750 | 0.03411 | 122 | −0.67412 | 0.72902 | 122 | 0.03951 | 0.08383 |
| 123 | 0.05309 | 0.13405 | 123 | −0.72087 | 0.79154 | 123 | −0.44700 | 0.05724 |
| 124 | 0.48471 | 0.06302 | 124 | −0.53596 | 0.55971 | 124 | −0.00553 | −0.05965 |
| 125 | −0.19095 | 0.29182 | 125 | −0.57668 | 0.60706 | 125 | −0.32514 | 0.32029 |
| 126 | −0.41427 | 0.00676 | 126 | −0.60653 | 0.64315 | 126 | −0.50547 | 0.13669 |
| 127 | −0.04937 | 0.02486 | 127 | −0.66463 | 0.71663 | 127 | −0.06322 | −0.09102 |
| 128 | 0.07529 | 0.17329 | 128 | −0.69296 | 0.75392 | 128 | −0.20835 | −0.10723 |
| 129 | −0.45081 | 0.03323 | 129 | −0.55645 | 0.58327 | 129 | 0.00771 | 0.09219 |
| 130 | −0.18449 | −0.03871 | 130 | −0.64548 | 0.69196 | 130 | 0.04488 | −0.01752 |
| 131 | −0.28669 | 0.33554 | 131 | −0.51519 | 0.53640 | 131 | −0.11028 | −0.10564 |
| 132 | −0.11356 | −0.01415 | 132 | −0.61635 | 0.65528 | 132 | −0.14383 | 0.15418 |
| 133 | 0.06114 | 0.14676 | 133 | −0.54624 | 0.57146 | 133 | −0.03976 | 0.10563 |
| 134 | −0.43893 | 0.02399 | 134 | −0.58669 | 0.61904 | 134 | −0.24608 | 0.23663 |
| 135 | 0.07886 | 0.21720 | 135 | −0.68357 | 0.74145 | 135 | −0.15758 | 0.16320 |
| 136 | −0.25922 | −0.04526 | 136 | −0.86081 | 0.80842 | 136 | −0.26938 | 0.25985 |
| 137 | −0.11932 | 0.26896 | 137 | −0.73924 | 0.81678 | 137 | −0.03355 | −0.07685 |
| 138 | −0.34730 | −0.02719 | 138 | −0.82650 | 0.72126 | 138 | 0.05618 | −0.00557 |
| 139 | −0.24418 | −0.04553 | 139 | −0.80876 | 0.67791 | 139 | −0.18418 | 0.18255 |
| 140 | 0.08162 | 0.20250 | 140 | −0.80276 | 0.66350 | 140 | −0.34661 | 0.34521 |
| 141 | 0.04459 | 0.12163 | 141 | −0.92966 | 1.01452 | 141 | −0.14281 | −0.11036 |
| 142 | −0.38838 | −0.00856 | 142 | −0.79326 | 0.89331 | 142 | −0.07069 | 0.11682 |
| 143 | −0.06158 | 0.01607 | 143 | −0.75304 | 0.54893 | 143 | −0.00822 | 0.09631 |
| 144 | 0.02915 | 0.24606 | 144 | −0.70673 | 0.44995 | 144 | −0.05532 | 0.11096 |
| 145 | −0.28915 | −0.04229 | 145 | −0.91485 | 0.95489 | 145 | −0.10075 | 0.13016 |
| 146 | 0.05799 | 0.23794 | 146 | −0.88829 | 0.88149 | 146 | −0.29208 | 0.28366 |
| 147 | −0.16988 | −0.03513 | 147 | −0.73354 | 0.50634 | 147 | −0.15924 | −0.11114 |
| 148 | −0.10472 | 0.26531 | 148 | −0.75743 | 0.84216 | 148 | 0.06635 | 0.00734 |
| 149 | −0.42675 | 0.01516 | 149 | −0.77830 | 0.60604 | 149 | 0.02067 | −0.03978 |
| 150 | −0.15546 | −0.03085 | 150 | −0.83232 | 0.73575 | 150 | −0.22202 | 0.21420 |
| 151 | −0.55484 | 0.14147 | 151 | −0.83697 | 0.95798 | 151 | −0.28080 | 0.27169 |
| 152 | 0.07036 | 0.22948 | 152 | −0.87192 | 0.83760 | 152 | 0.07430 | 0.02171 |

TABLE 1-continued

Gas Generator Turbine Stage 2 Blade

| Z1 (25%) span Z1 Axial Chord = AX1 | | | Z2 (50%) span Z2 Axial Chord = AX2 | | | Z3 (75%) span Z3 Axial Chord = AX3 | | |
|---|---|---|---|---|---|---|---|---|
| Point # | X | Y | Point # | X | Y | Point # | X | Y |
| 153 | −0.09004 | 0.26198 | 153 | −0.78448 | 0.62038 | 153 | −0.40336 | 0.00803 |
| 154 | −0.22914 | −0.04500 | 154 | −0.89902 | 0.91081 | 154 | −0.42572 | 0.03215 |
| 155 | −0.31861 | −0.03622 | 155 | −0.84557 | 0.97101 | 155 | −0.25781 | 0.24815 |
| 156 | −0.46239 | 0.04283 | 156 | −0.68593 | 0.40798 | 156 | −0.30053 | −0.07336 |
| 157 | −0.37498 | −0.01540 | 157 | −0.81963 | 0.93202 | 157 | −0.53222 | 0.17816 |
| 158 | −0.03075 | 0.25179 | 158 | −0.86263 | 0.99717 | 158 | 0.07862 | 0.03752 |
| 159 | −0.21889 | 0.30300 | 159 | −0.78437 | 0.88047 | 159 | 0.00781 | −0.05003 |
| 160 | −0.04565 | 0.25388 | 160 | −0.90961 | 0.94018 | 160 | −0.34182 | −0.04640 |
| 161 | −0.12727 | −0.02033 | 161 | −0.72026 | 0.47809 | 161 | −0.46731 | 0.08311 |
| 162 | −0.50594 | 0.08434 | 162 | −0.73008 | 0.80414 | 162 | −0.41468 | 0.01996 |
| 163 | −0.40148 | −0.00116 | 163 | −0.82063 | 0.70679 | 163 | −0.54926 | 0.20629 |
| 164 | −0.14125 | −0.02591 | 164 | −0.85412 | 0.98407 | 164 | −0.22445 | −0.10389 |
| 165 | −0.33307 | −0.03206 | 165 | −0.85519 | 0.79386 | 165 | −0.48678 | 0.10963 |
| 166 | −0.19926 | −0.04157 | 166 | −0.89367 | 0.89614 | 166 | −0.35719 | 0.35780 |
| 167 | −0.27337 | 0.32854 | 167 | −0.69986 | 0.43592 | 167 | −0.17102 | 0.17267 |
| 168 | −0.17682 | 0.28665 | 168 | −0.69293 | 0.42193 | 168 | −0.33592 | 0.33271 |
| 169 | 0.07991 | 0.18759 | 169 | −0.77544 | 0.86767 | 169 | 0.02370 | 0.08833 |
| 170 | −0.52617 | 0.10661 | 170 | −0.90725 | 1.03405 | 170 | −0.07860 | −0.09684 |
| 171 | −0.14826 | 0.27719 | 171 | −0.87108 | 1.01029 | 171 | −0.32844 | −0.05597 |
| 172 | 0.02633 | 0.09772 | 172 | −0.82833 | 0.94498 | 172 | −0.19705 | 0.19279 |
| 173 | −0.36128 | −0.02162 | 173 | −0.80210 | 0.90618 | 173 | −0.08584 | 0.12322 |
| 174 | −0.54549 | 0.12968 | 174 | −0.81472 | 0.69234 | 174 | −0.45727 | 0.07008 |
| 175 | −0.01480 | 0.05384 | 175 | −0.74010 | 0.52051 | 175 | −0.31424 | 0.30797 |
| 176 | −0.00397 | 0.06429 | 176 | −0.72693 | 0.49220 | 176 | −0.17568 | −0.11087 |
| 177 | 0.06871 | 0.15976 | 177 | −0.88287 | 0.86684 | 177 | −0.49622 | 0.12310 |
| 178 | −0.10011 | −0.00739 | 178 | −0.84384 | 0.76477 | 178 | −0.54081 | 0.19218 |
| 179 | −0.21416 | −0.04367 | 179 | −0.81089 | 0.91908 | 179 | −0.36748 | −0.02582 |
| 180 | −0.56399 | 0.15341 | 180 | −0.87955 | 1.02341 | 180 | −0.24032 | −0.09955 |
| 181 | −0.07411 | 0.00774 | 181 | −0.75943 | 0.56317 | 181 | −0.11540 | 0.13764 |
| 182 | 0.04391 | 0.24318 | 182 | −0.87741 | 0.85222 | 182 | −0.12647 | −0.10853 |
| 183 | −0.30396 | −0.03963 | 183 | −0.92005 | 0.96961 | 183 | −0.27113 | −0.08808 |
| 184 | 0.00650 | 0.07510 | 184 | −0.89189 | 1.03264 | 184 | −0.55758 | 0.22048 |
| 185 | −0.47369 | 0.05277 | 185 | −0.92115 | 1.02738 | 185 | −0.39172 | −0.00360 |
| 186 | −0.53594 | 0.11806 | 186 | −0.71352 | 0.46400 | 186 | −0.28601 | −0.08109 |
| 187 | 0.01416 | 0.24733 | 187 | −0.67885 | 0.39407 | 187 | −0.04819 | −0.08434 |
| 188 | −0.25993 | 0.32177 | 188 | −0.74660 | 0.53471 | 188 | 0.03304 | −0.02893 |
| 189 | −0.20498 | 0.29727 | 189 | −0.92523 | 0.98434 | 189 | −0.02405 | 0.10077 |
| 190 | −0.02597 | 0.04378 | 190 | −0.83810 | 0.75025 | 190 | −0.23415 | 0.22530 |
| 191 | −0.08696 | −0.00008 | 191 | −0.76577 | 0.57744 | 191 | −0.47714 | 0.09629 |
| 192 | 0.03567 | 0.10952 | 192 | −0.77206 | 0.59173 | 192 | 0.06762 | 0.06725 |
| 193 | 0.01660 | 0.08625 | 193 | −0.79062 | 0.63473 | 193 | 0.05447 | 0.07705 |
| 194 | −0.13383 | 0.27292 | 194 | −0.79672 | 0.64910 | 194 | −0.01932 | −0.06860 |
| 195 | −0.06050 | 0.25627 | 195 | −0.93026 | 0.99911 | 195 | 0.07674 | 0.05370 |
| 196 | −0.00084 | 0.24852 | 196 | −0.86638 | 0.82301 | 196 | −0.35483 | −0.03634 |
| 197 | −0.01581 | 0.25000 | 197 | −0.90433 | 0.92549 | 197 | −0.52347 | 0.16423 |
| 198 | −0.07530 | 0.25897 | 198 | −0.74836 | 0.82945 | 198 | −0.19207 | −0.10956 |
| 199 | −0.24637 | 0.31526 | 199 | −0.84954 | 0.77930 | 199 | −0.25589 | −0.09426 |
| 200 | −0.51617 | 0.09537 | 200 | −0.76646 | 0.85490 | 200 | −0.51455 | 0.15041 |

This set of points represents a novel and unique solution to the target design criteria mentioned herein above with respect to gas generator turbine blades of exemplified engine 10. Scaling for these points was achieved by dividing the coordinate by the local axial chord. According to at least some embodiments, the airfoil profiles defined herein are particularly configured to improve the service life of the gas generator turbine blades of exemplified engine 10.

In general, the airfoils 100, as described herein, have a combination of axial sweep and tangential lean. Depending on configuration, the lean and sweep angles sometimes vary by up to ±10° or more. In addition, the gas generator turbine blades are sometimes rotated with respect to a radial axis or a normal to the platform or shroud surface, for example, by up to ±10° or more. Novel aspects of the gas generator turbine blades and associated airfoil surfaces described herein are achieved by substantial conformance to specified geometries. Substantial conformance generally includes or may include a manufacturing tolerance of ±0.0035 inches and/or ±0.05 inches, in order to account for variations in molding, cutting, shaping, surface finishing and other manufacturing processes, and to accommodate variability in coating thicknesses. This tolerance is generally constant or not scalable, and applies to each of the specified gas generator turbine blade surfaces, regardless of size.

Substantial conformance is based on sets of points representing a three-dimensional surface with particular physical dimensions, for example, in inches or millimeters, as determined by selecting particular values of the scaling parameters. A substantially conforming airfoil, blade, or vane structure has surfaces that conform to the specified sets of points, within the specified tolerance.

Alternatively, substantial conformance is based on a determination by a national or international regulatory body, for example, in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade, or vane, or that the part or structure complies with airworthiness standards applicable to the specified blade, vane, or airfoil. In particular, substantial conformance encompasses any regulatory determination that a particular part or structure is sufficiently similar to, identical to, or the same as a specified blade, vane, or airfoil, such that certification or authorization for use is based at least in part on the determination of similarity.

Further aspects of the present disclosure are provided by the subject matter of the following clauses.

A gas generator turbine blade for a gas turbine engine, the gas generator turbine blade comprising: an airfoil having a leading edge and a trailing edge joined by a pressure side and a suction side to provide an external airfoil surface configured to extend from a platform of the gas generator turbine blade in a spanwise direction to a tip. The external airfoil surface is formed in conformance with multiple cross-section profiles of the airfoil described by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the airfoil between the leading edge and the trailing edge at the span location.

The gas generator turbine blade according to the preceding clause, wherein the span location corresponds to a distance from a rotation axis of the airfoil.

The gas generator turbine blade according to any of the preceding clauses, wherein the Cartesian coordinates in Table 1 have a tolerance relative to the specified coordinates of ±0.0035 inches.

The gas generator turbine blade according to any of the preceding clauses, wherein the Cartesian coordinates in Table 1 have a tolerance relative to the specified coordinates of ±0.05 inches.

The gas generator turbine blade according to any of the preceding clauses, wherein the Cartesian coordinates define points on a cold, uncoated airfoil surface at nominal restagger, in a plane at the span location.

A gas generator turbine blade for a gas turbine engine, the gas generator turbine blade comprising: a platform and an airfoil extending in a spanwise direction from the platform to a tip, the airfoil having an external airfoil surface formed in conformance with multiple cross-section airfoil profiles described by a set of Cartesian coordinates set forth in Table 1.

The gas generator turbine blade according to the preceding clause, wherein the Cartesian coordinates in Table 1 have Cartesian coordinate values for a cold, uncoated condition at nominal restagger.

The gas generator turbine blade according to any of the preceding clauses, wherein the Cartesian coordinates in Table 1 have a tolerance relative to the specified coordinates of ±0.0035 inches.

The gas generator turbine blade according to any of the preceding clauses, wherein the Cartesian coordinates in Table 1 have a tolerance relative to the specified coordinates of ±0.05 inches.

The gas generator turbine blade according to any of the preceding clauses, wherein the airfoil has a leading edge and a trailing edge joined by a pressure side and a suction side to provide the external airfoil surface.

The gas generator turbine blade according to any of the preceding clauses, wherein the Cartesian coordinates are provided by an axial coordinate scaled by a local axial chord, a circumferential coordinate scaled by the local axial chord, and a span location, wherein the local axial chord corresponds to a width of the airfoil between the leading edge and the trailing edge at the span location.

The gas generator turbine blade according to any of the preceding clauses, wherein the gas generator turbine blade is a second-stage blade.

The gas generator turbine blade according to any of the preceding clauses, wherein the span location corresponds to a distance from a rotation axis of the airfoil.

The gas generator turbine blade according any of the preceding clauses, wherein the Cartesian coordinates define points on the external airfoil surface at nominal restagger and in a plane at the span location.

A gas turbine engine comprising: a gas generator turbine blade having an array of airfoils, wherein at least one airfoil of the array of airfoils has a leading edge and a trailing edge that are joined by spaced-apart pressure and suction sides to provide an external airfoil surface extending from a platform in a span direction to a tip. The external airfoil surface is formed in conformance with multiple cross-section profiles of the at least one airfoil described by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the at least one airfoil between the leading edge and the trailing edge at the span location.

The gas turbine engine according to the preceding clause, wherein the span location corresponds to a distance from a rotation axis of the at least one airfoil.

The gas turbine engine according to any of the preceding clauses, wherein the Cartesian coordinates in Table 1 have a tolerance relative to the specified coordinates of ±0.0035 inches.

The gas turbine engine according to any of the preceding clauses, wherein the Cartesian coordinates in Table 1 have a tolerance relative to the specified coordinates of ±0.05 inches.

The gas turbine engine according to any of the preceding clauses, wherein the Cartesian coordinates define points on a cold, uncoated airfoil surface of the at least one airfoil at nominal restagger, in a plane at the span location.

The gas turbine engine according to any of the preceding clauses, wherein the gas generator turbine blade is a second-stage blade.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that the present disclosure is not limited to the precise aspects described, and that various other changes and modifications may be effected by one skilled in the art without departing from the scope or spirit of the disclosure. Additionally, the elements and features shown or described in connection with certain aspects may be combined with the elements and features of certain other aspects without departing from the scope of the present disclosure, and that such modifications and variations are also included within the scope of the present disclosure.

Accordingly, the subject matter of the present disclosure is not limited by what has been particularly shown and described.

What is claimed is:

1. A gas generator turbine blade for a gas turbine engine, the gas generator turbine blade comprising:
   an airfoil having a leading edge and a trailing edge joined by a pressure side and a suction side to provide an external airfoil surface configured to extend from a platform of the gas generator turbine blade in a spanwise direction to a tip; and
   wherein the external airfoil surface is formed in conformance with multiple cross-section profiles of the airfoil described by a set of Cartesian coordinates defined along axial, circumferential, and span axes having an origin at an intersection of the axes, the set of Cartesian coordinates set forth in Table 1, the Cartesian coordinates provided by an axial coordinate scaled by a local axial chord, a circumferential coordinate scaled by the local axial chord, and a span location, a zero span location taken at a point where the airfoil meets the platform, wherein the local axial chord corresponds to a width of the airfoil between the leading edge and the trailing edge at the span location.

2. The gas generator turbine blade according to claim 1, wherein the span location corresponds to a distance from a rotation axis of the airfoil.

3. The gas generator turbine blade according to claim 1, wherein the Cartesian coordinates in Table 1 have a tolerance relative to the specified coordinates of ±0.0035 inches.

4. The gas generator turbine blade according to claim 1, wherein the external airfoil surface includes an uncoated airfoil surface, and wherein the Cartesian coordinates define points on the uncoated airfoil surface at nominal restagger, in a plane at the span location.

5. The gas generator turbine blade according to claim 1, wherein the Cartesian coordinates in Table 1 have a tolerance relative to the specified coordinates of ±0.05 inches.

6. A gas generator turbine blade for a gas turbine engine, the gas generator turbine blade comprising:
   a platform; and
   an airfoil extending in a spanwise direction from the platform to a tip, the airfoil having an external airfoil surface formed in conformance with multiple cross-section airfoil profiles described by a set of Cartesian coordinates defined along axial, circumferential, and span axes having an origin at an intersection of the axes, the set of Cartesian coordinates set forth in Table 1.

7. The gas generator turbine blade according to claim 6, wherein the Cartesian coordinates in Table 1 have Cartesian coordinate values for an uncoated condition of the external airfoil surface at nominal restagger.

8. The gas generator turbine blade according to claim 6, wherein the Cartesian coordinates in Table 1 have a tolerance relative to the specified coordinates of ±0.0035 inches.

9. The gas generator turbine blade according to claim 6, wherein the Cartesian coordinates in Table 1 have a tolerance relative to the specified coordinates of ±0.05 inches.

10. The gas generator turbine blade according to claim 6, wherein the airfoil has a leading edge and a trailing edge joined by a pressure side and a suction side to provide the external airfoil surface.

11. The gas generator turbine blade according to claim 6, wherein the Cartesian coordinates are provided by an axial coordinate scaled by a local axial chord, a circumferential coordinate scaled by the local axial chord, and a span location, a zero span location taken at a point where the airfoil meets the platform, wherein the local axial chord corresponds to a width of the airfoil between a leading edge of the gas generator turbine blade and a trailing edge of the gas generator turbine blade at the span location.

12. The gas generator turbine blade according to claim 6, wherein the gas generator turbine blade is a second-stage blade.

13. The gas generator turbine blade according to claim 11, wherein the span location corresponds to a distance from a rotation axis of the airfoil.

14. The gas generator turbine blade according to claim 11, wherein the external airfoil surface includes an uncoated airfoil surface, and wherein the Cartesian coordinates define points on the uncoated airfoil surface at nominal restagger, in a plane at the span location.

15. A gas turbine engine comprising:
   a gas generator turbine blade having an array of airfoils, wherein at least one airfoil of the array of airfoils has a leading edge and a trailing edge that are joined by spaced-apart pressure and suction sides to provide an external airfoil surface extending from a platform in a span direction to a tip; and
   wherein the external airfoil surface is formed in conformance with multiple cross-section profiles of the at least one airfoil described by a set of Cartesian coordinates defined along axial, circumferential, and span axes having an origin at an intersection of the axes, the set of Cartesian coordinates set forth in Table 1, the Cartesian coordinates provided by an axial coordinate scaled by a local axial chord, a circumferential coordinate scaled by the local axial chord, and a span location, a zero span location taken at a point where the airfoil meets the platform, wherein the local axial chord corresponds to a width of the at least one airfoil between the leading edge and the trailing edge at the span location.

16. The gas turbine engine according to claim 15, wherein the span location corresponds to a distance from a rotation axis of the at least one airfoil.

17. The gas turbine engine according to claim 15, wherein the Cartesian coordinates in Table 1 have a tolerance relative to the specified coordinates of ±0.0035 inches.

18. The gas turbine engine according to claim 15, wherein the Cartesian coordinates in Table 1 have a tolerance relative to the specified coordinates of ±0.05 inches.

19. The gas turbine engine according claim 15, wherein the Cartesian coordinates define points on an uncoated airfoil surface of the at least one airfoil at nominal restagger, in a plane at the span location.

20. The gas turbine engine according to claim 15, wherein the gas generator turbine blade is a second-stage blade.

* * * * *